United States Patent
Nakatsugawa et al.

(10) Patent No.: US 7,825,620 B2
(45) Date of Patent: Nov. 2, 2010

(54) CONTROLLER AND CONSTANT MEASURING APPARATUS FOR AC MOTOR

(75) Inventors: Junnosuke Nakatsugawa, Hitachi (JP);
Yoshitaka Iwaji, Hitachinaka (JP);
Kazuaki Tobari, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 503 days.

(21) Appl. No.: 11/838,342

(22) Filed: Aug. 14, 2007

(65) Prior Publication Data

US 2008/0079378 A1    Apr. 3, 2008

(30) Foreign Application Priority Data

Sep. 28, 2006  (JP) ............................. 2006-263723

(51) Int. Cl.
*H02P 27/04* (2006.01)
(52) U.S. Cl. .................... 318/800; 318/801; 318/490
(58) Field of Classification Search ............... 318/628, 318/652, 647, 690, 700, 400.01, 400.02, 318/727, 801, 244, 254.1, 432, 434, 437, 318/508, 512, 533, 472, 803, 807
See application file for complete search history.

(56) References Cited

U.S. PATENT DOCUMENTS

| | | | | |
|---|---|---|---|---|
| 5,475,293 A | * | 12/1995 | Sakai et al. | 318/802 |
| 5,594,670 A | * | 1/1997 | Yamamoto | 702/64 |
| 5,811,956 A | * | 9/1998 | Yamamoto | 318/801 |
| 5,861,728 A | * | 1/1999 | Tazawa et al. | 318/778 |
| 5,969,500 A | * | 10/1999 | Ishikawa et al. | 318/807 |
| 5,973,474 A | * | 10/1999 | Yamamoto | 318/801 |
| 6,028,406 A | * | 2/2000 | Birk | 318/400.04 |
| 6,570,358 B2 | * | 5/2003 | Nakatsugawa et al. | 318/727 |
| 6,657,413 B2 | * | 12/2003 | Nakatsugawa et al. | 318/700 |
| 6,700,400 B2 | * | 3/2004 | Atarashi | 324/772 |
| 6,956,352 B2 | * | 10/2005 | Tarkiainen et al. | 318/800 |
| 6,984,959 B2 | * | 1/2006 | Satake et al. | 318/720 |
| 7,039,542 B2 | * | 5/2006 | Fujii et al. | 702/115 |
| 7,119,530 B2 | * | 10/2006 | Mir et al. | 324/76.15 |
| 7,408,322 B2 | * | 8/2008 | Kinpara et al. | 318/799 |
| 7,423,401 B2 | * | 9/2008 | Kinpara et al. | 318/490 |

(Continued)

FOREIGN PATENT DOCUMENTS

CN    1835383 A    2/2006

(Continued)

OTHER PUBLICATIONS

Office Action in Chinese Patent Appln. 200710140846.5, dated Jul. 31, 2009; with partial English language translation of the First Chinese Office Action (the text) [4 pages].

*Primary Examiner*—Walter Benson
*Assistant Examiner*—Antony M Paul
(74) *Attorney, Agent, or Firm*—Antonelli, Terry, Stout & Kraus, LLP.

(57) ABSTRACT

A controller and a constant measuring apparatus have a means for supplying a synthesized current, resulting from superimposing an AC current to a DC current, from an inverter and for changing the DC current component of the synthesized current continuously or discontinuously. Accordingly, the controller and constant measuring apparatus can measure inductances, which are electric constants of the AC motor, with high accuracy and can use the measured inductances for control.

10 Claims, 11 Drawing Sheets

U.S. PATENT DOCUMENTS

2006/0055362 A1 * 3/2006 Tobari et al. ................ 318/716

FOREIGN PATENT DOCUMENTS

| JP | 2000-050700 | | 2/2000 |
|---|---|---|---|
| JP | 2001-069782 | | 3/2001 |
| JP | WO2006008846 | * | 1/2006 |
| JP | 2006-262643 | | 9/2006 |

* cited by examiner

CONTROLLER AND CONSTANT MEASURING APPARATUS FOR AC MOTOR

CLAIM OF PRIORITY

The present application claims priority from Japanese application serial No. 2006-263723, filed on Sep. 28, 2006, the content of which is hereby incorporated by reference into this application.

FIELD OF THE INVENTION

The present invention relates to a controller for an AC motor and, more particularly, to a controller and a measuring apparatus that measure inductance, which are electric constants of the AC motor, with high accuracy, and have a function for using the measured inductance for control.

BACKGROUND OF THE INVENTION

Patent Document 1 discloses technology for measuring electric constants of an AC motor by using a controller such as for an inverter. In this technology (referred to below as prior art 1), a DC component is flowed to an arbitrary phase for a synchronous motor, and the position of the rotor is fixed; an AC current is then superimposed and electric constants are measured. Patent Document 2 discloses technology (referred to below as prior art 2), in which, to derive inductance, AC voltages are applied to the d-axis and q-axis and integrated over time to calculate a magnetic flux, and a hysteresis curve is drawn with current on the horizontal axis and magnetic flux on the vertical axis.

Patent Document 1: Japanese Patent Laid-open No. 2000-50700

Patent Document 2: Japanese Patent Laid-open No. 2001-69782

SUMMARY OF THE INVENTION

In prior art 1, a DC current is flowed in the direction of the magnetic flux of the magnet so as to fix the rotor, and an AC current is used for inductance measurement. When the motor is actually driven, however, a DC current is applied to the d-axis and q-axis. Accordingly, accurate values cannot be obtained in inductance measurement in which an AC current is flowed. Particularly, when the AC current is flowed, a positive current and a negative current cannot be distinguished; for example, a difference in inductance cannot be measured between the positive d-axis current and negative d-axis current.

In prior art 2, in which AC voltages applied to the d-axis and q-axis are integrated over time to calculate a magnetic flux, there is a possibility that error is generated during a process of integration over time. Furthermore, it is difficult to reflect the effect of mutually interfering components of the d-axis and q-axis magnetic fluxes.

The present invention addresses the above problems with the object of providing a motor controller and constant measuring apparatus that can measure electric constants of a motor with comparatively high accuracy and can use the measured electric constants for control.

The above object can be achieved by providing a means for supplying a synthesized current, resulting from superimposing an AC current to a DC current, from an inverter and for changing the DC current component of the synthesized current continuously or discontinuously.

According to the present invention, electric constants of an AC motor can be measured with comparatively higher accuracy.

DESCRIPTION OF THE PREFERRED EMBODIMENTS

Embodiments of an AC motor controller according to the present invention will be described next with reference to FIGS. 1 to 14. In the explanation of the embodiments below, a permanent magnet synchronous motor (referred to below as the PM motor) is used; however, another motor, such as, for example, a wound-rotor synchronous motor, reluctance motor, or induction motor, can be used to implement the embodiments in the same way.

First Embodiment

Figure 1:
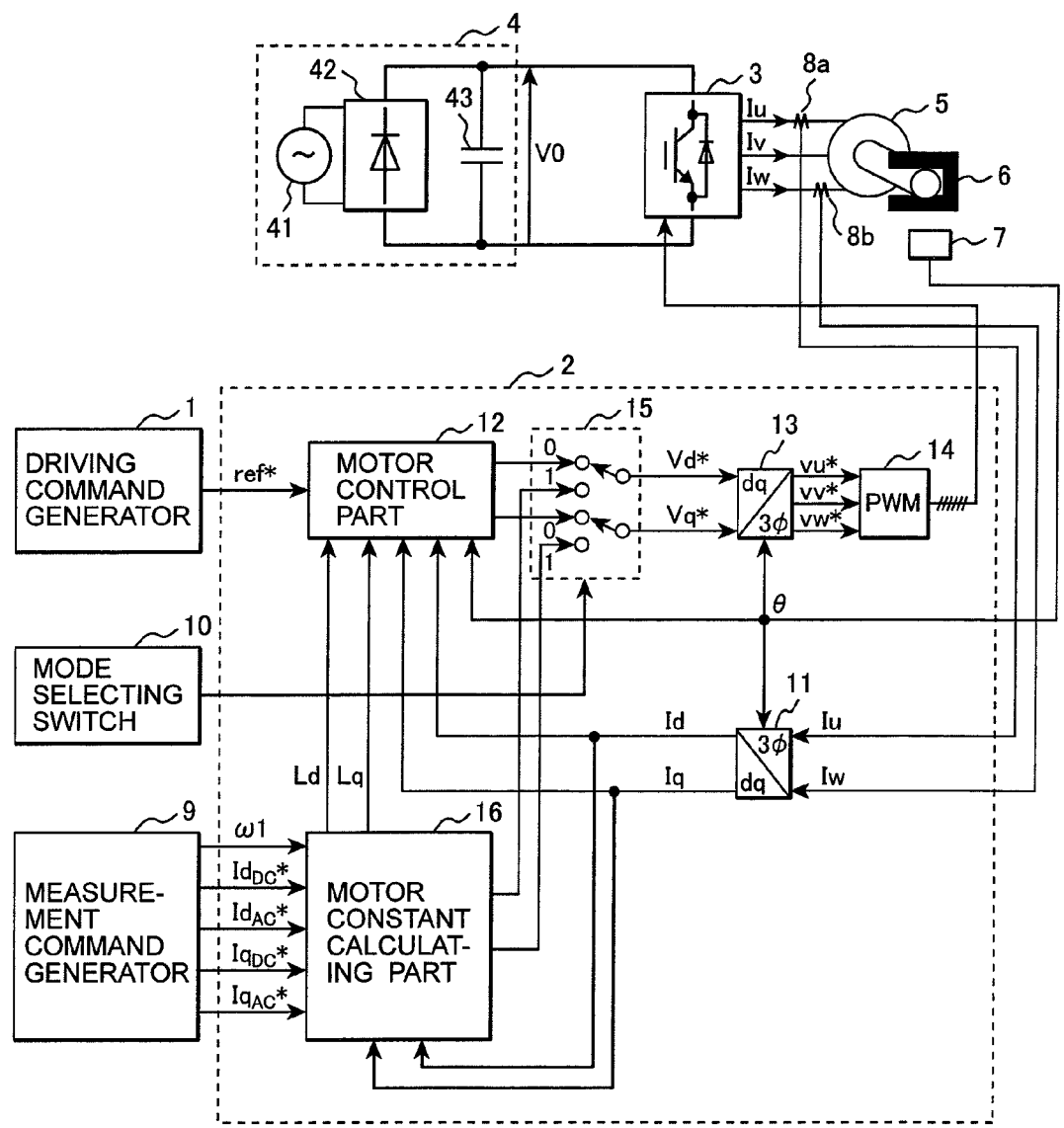
FIG. 1 is a block diagram showing the systematic structure in a first embodiment of the present invention.

FIG. 1 is a block diagram showing the systematic structure of an AC motor controller in a first embodiment of the present invention. The controller in the first embodiment comprises a driving command generator 1 that gives a motor a driving command ref* for a position, speed, torque, current, or the like, a control unit 2 that calculates an AC voltage to be applied to the motor, performs conversion into a pulse width modulated (PWM) signal, and outputs the converted signal; an inverter 3 driven by the PWM signal; a DC power supply 4 for supplying electric power to the inverter 3; a permanent magnet synchronous motor 5 (referred to below as the PM motor 5) to be controlled; a rotor fixing device 6 for fixing the rotor of the PM motor 5; a position detector 7 for detecting the position of the rotor of the PM motor 5; a current detector 8a and a current detector 8b for respectively detecting currents Iu and Iw supplied by the inverter 3 to the PM motor 5; a measurement command generator 9 for setting an angular frequency ω1 of an AC signal that is a measurement command in an electric constant measurement mode, a value of a d-axis DC current component $Id_{DC}^*$, a value of a d-axis AC current component $Id_{AC}^*$, a value of a q-axis DC current component $Iq_{DC}^*$, and a value of a q-axis AC current component $Iq_{AC}^*$; and a mode selecting switch 10 that toggles the operation mode of the controller between an ordinary driving mode and an automatic electric constant measurement mode.

The control unit 2 comprises a d-q coordinate converter 11 for performing coordinate conversion from detected currents Iu and Iw to Id and Iq, which are components on the d-axis and q-axis, according to a phase angle θ (position of the magnet flux of the PM motor, the position being detected by the position detector 7); a motor control part 12 for calculating voltage commands Vd* and Vq*, which are used to drive the PM motor in an ordinary manner, according to a command ref*, detected current values Id and Iq, and the phase angle θ; a d-q deconverting part 13 for converting Vd* and Vq* to three-phase AC voltage commands vu*, vv*, and vw*; a PWM signal generator 14 for generating a pulse width modulated (PWM) signal, which is used to cause the inverter 3 to perform a switchover operation, according to the three-phase AC voltage commands; a voltage command switch 15 that toggles the voltage commands between the ordinary driving mode and the electric constant measurement mode; and a motor constant calculating part 16 for accepting the angular frequency ω1 of the AC signal, which is a measurement command, the value of the d-axis DC component $Id_{DC}^*$, the value of the d-axis AC component $Id_{AC}^*$, the value of the q-axis DC component $Iq_{DC}^*$, the value of the q-axis AC component $Iq_{AC}^*$, and the detected current values Id and Iq so as to generate applied voltage commands Vd* and Vq* necessary for electric constant measurement, and to calculate and deliver electric constants of the PM motor.

The DC power supply 4 for supplying electric power to the inverter 3 comprises an AC power supply 41, a diode bridge 42 for rectifying an AC current, and a smoothing capacitor 43 for suppressing pulsing components included in the power from the DC power supply.

Next, the principle of operation in the first embodiment will be described with reference to FIG. 1.

The controller in the present invention has two operation modes: ordinary driving mode for the PM motor 5 and electric constant measurement mode. These modes are selectively selected according to signals from a mode selecting switch 10. In the ordinary driving mode, the voltage command switch 15 is set to 0; in the electric constant measurement mode, it is set to 1.

First, the ordinary driving mode will be described. The driving command generator 1 delivers a driving command ref*, such as for the position, speed, torque, or current of the motor, to the motor control part 12 by use of a digital or analog communication means. The motor control part 12 calculates voltage commands Vd* and Vq* necessary for driving the PM motor, according to ref*, the detected current values Id and Iq, and the electric constants. The d-q coordinate converter 11 converts the AC currents Iu and Iw to the current components Id and Iq on the rotational coordinate axes (d and q axes), according to the phase angle θ. The voltage commands Vd* and Vq* are converted by the d-q deconverting part 13 to AC quantities, the AC quantities are then converted to a pulse width modulated signal by the PWM signal generator 14; the pulse width modulated signal is sent to the inverter 3.

To describe the operation in the constant measurement mode, which is a feature in the present invention, the operation of the motor constant calculating part 16 will be described below in detail with reference to FIGS. 2 to 10.

Figure 2:
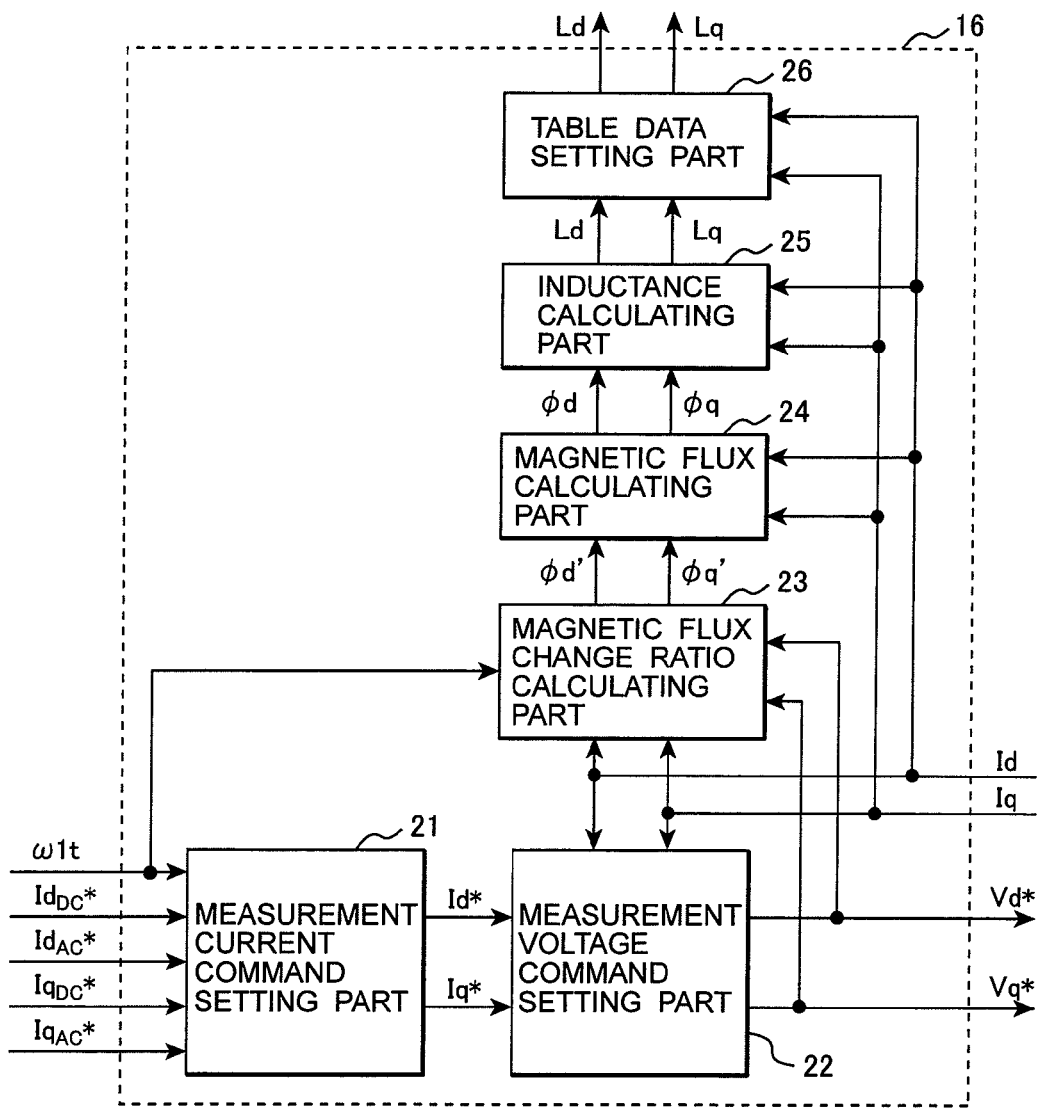
FIG. 2 is a block diagram showing the systematic structure of a motor constant calculating part in the first embodiment of the present invention.

A measurement current command setting part 21 accepts $Id_{DC}^*$, $Id_{AC}^*$, $Iq_{DC}^*$, $Iq_{AC}^*$, and ω1 and outputs measurement current commands Id* and Iq*, as shown in FIG. 2.

In this embodiment, Ld is calculated by passing Id alone, and Lq is calculated by passing Iq alone. When Id is passed alone, Iq* is set to 0, that is, both $Iq_{DC}^*$ are $Iq_{AC}^*$ are set to 0. When Iq is passed alone, Id* is set to 0, that is, both $Id_{DC}^*$ and $Id_{AC}^*$ are set to 0.

How Ld when Id is passed alone is calculated will be then described.

Figure 3:
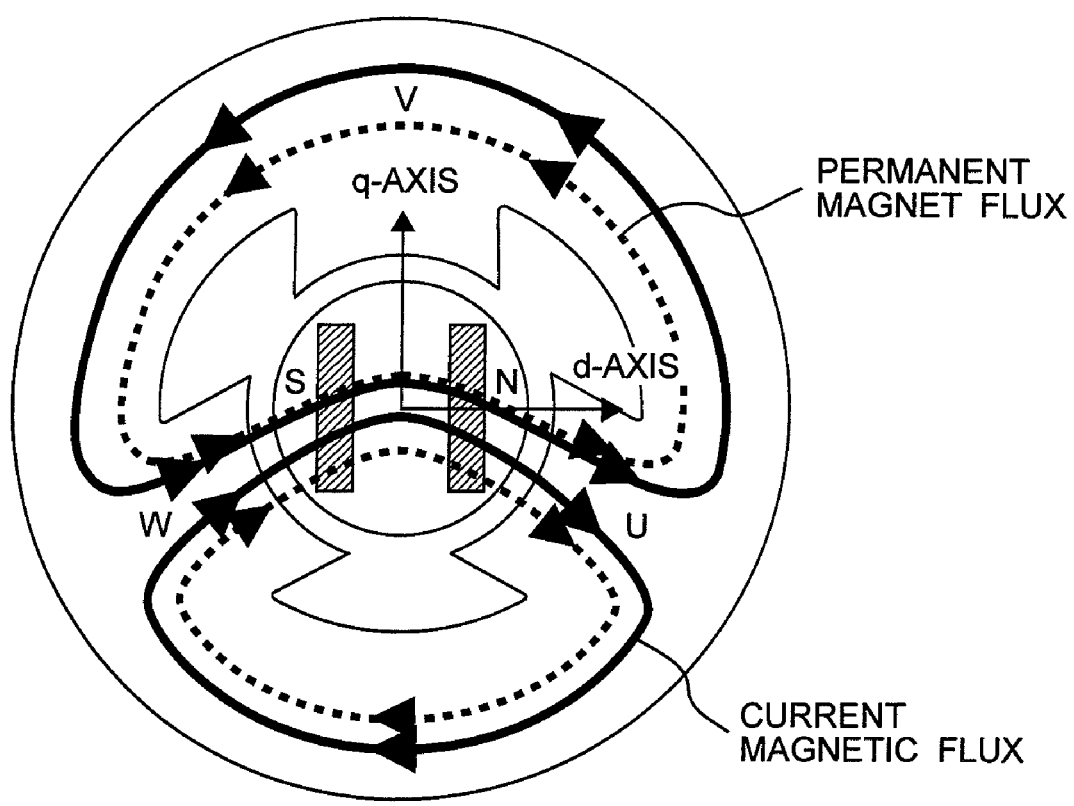
FIG. 3 shows a position of the rotor of a motor in the first embodiment of the present invention.

For example, the direction of the permanent magnet flux of the PM motor 5 is made to match the direction of a magnetic flux generated by passing a current between the U and W phases, and the rotor is fixed by the rotor fixing device 6 as shown in FIG. 3.

In this embodiment, a d-axis current is flowed by passing a current between the U and W phases, and a current command indicated below is output from the measurement current command setting part 21 shown in FIG. 2.

$$Id^* = Id_{DC}^* + Id_{AC}^* \times \sin(\omega 1 \times t) \quad \text{(Equation 1)}$$

A measurement voltage command setting part 22 supplies a voltage command Vd* so that the detected current value Id matches the current command Id*.

A magnetic flux change ratio calculating part 23 accepts the angular frequency ω1, voltage command Vd*, and detected current value Id. The detected current value is approximately represented by the following equation.

$$Id = Id_{DC} + Id_{AC} \times \sin(\omega 1 \times t) \quad \text{(Equation 2)}$$

A change ratio φd' of the magnetic flux φd with respect to a current change in the DC component $Id_{DC}$ of the detected current value is calculated according to the following equation.

$$\phi d' = d(\phi d)/d(id) = Vd_{AC}^*/(\omega 1 \times Id_{AC}) \quad \text{(Equation 3)}$$

Figure 4:
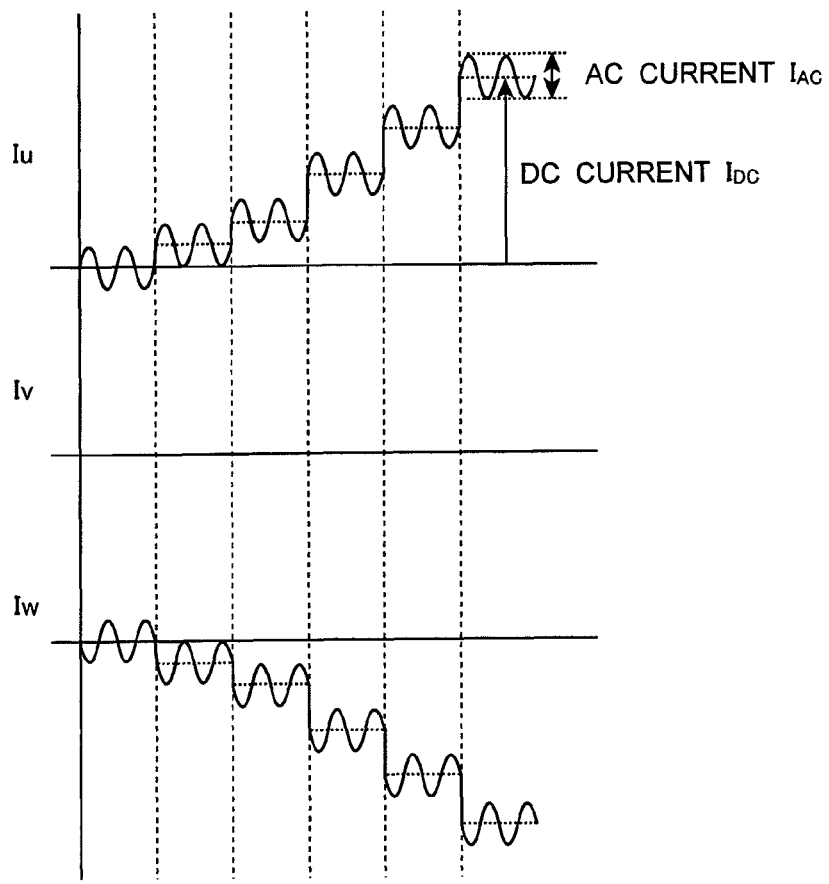
FIG. 4 shows current waveforms of the motor in the first embodiment of the present invention.

The AC component of the current is fixed and the DC component is changed discontinuously, as shown in FIG. 4. Then, φd' is calculated at different DC current $Id_{DC}$ values. As values of the DC component to be changed discontinuously, it is preferable that the range from zero to the maximum current is divided into about four segments and at least one point near zero is taken. This is because the change ratio of the magnetic flux is large near the zero current and thereby data is acquired at short intervals so as to reduce error in approximation described later.

A magnetic flux calculating part 24 calculates the magnetic flux φd from φd' and Id entered into it, as described below.

When an approximation equation for Taylor expansion is applied to the relation between the magnetic flux φ and current i, the following equation is obtained.

$$\phi(i_1) \approx \phi(i_0) + \phi'(i_0) \times (i_1 - i_0)/1! + \phi''(i_0) \times (i_1 - i_0)^2/2! + \ldots \quad \text{(Equation 4)}$$

Figure 5:
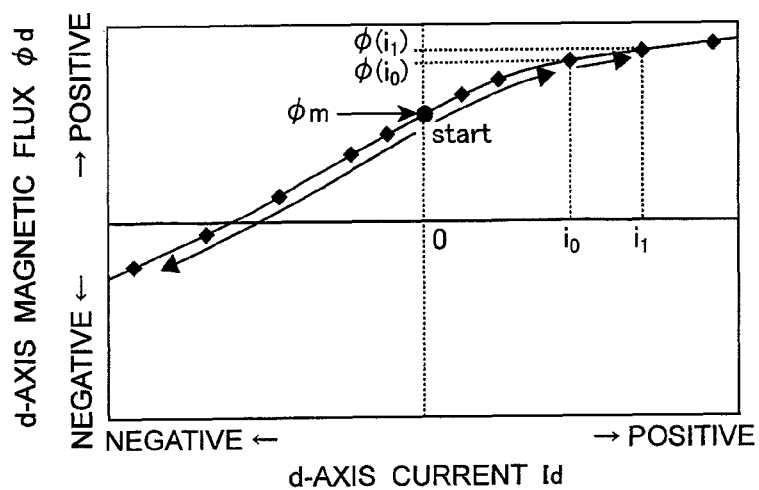
FIG. 5 is a graph of the d-axis magnetic flux in the first embodiment of the present invention.

If φ, φ', φ", . . . at current $i_0$ is known, an approximate value of φ at current $i_1$ is obtained. The magnetic flux φd at a DC current of 0, that is, the permanent magnet flux φm can be calculated from an induced electromotive force. The differential terms of the magnetic flux at φ" and later are calculated by a difference method. Accordingly, as illustrated in FIG. 5, φd values at different DC current $Id_{DC}$ values can be calculated, starting from the magnetic flux φm at a current of 0.

An inductance calculating part 25 uses φd entered into it to calculate an inductance Ld according to the equation given below, and outputs the calculated inductance.

$$\phi d = Ld \times Id + \phi m \quad \text{(Equation 5)}$$

Figure 6:
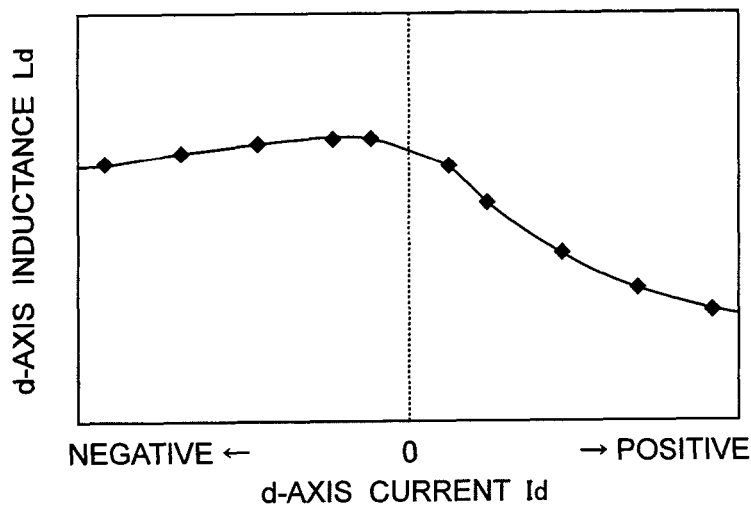
FIG. 6 is a graph of the d-axis inductance in the first embodiment of the present invention.

As a result, Ld is obtained as illustrated in FIG. 6.

The obtained Ld is entered into a table data setting part 26 and stored as table data. When the ordinary driving mode is selected by the mode selecting switch 10, Ld appropriately selected according to the detected current value Id is entered into the motor control part 12 and used for control.

Next, how Lq when Iq is passed alone is calculated will be described.

Figure 7:
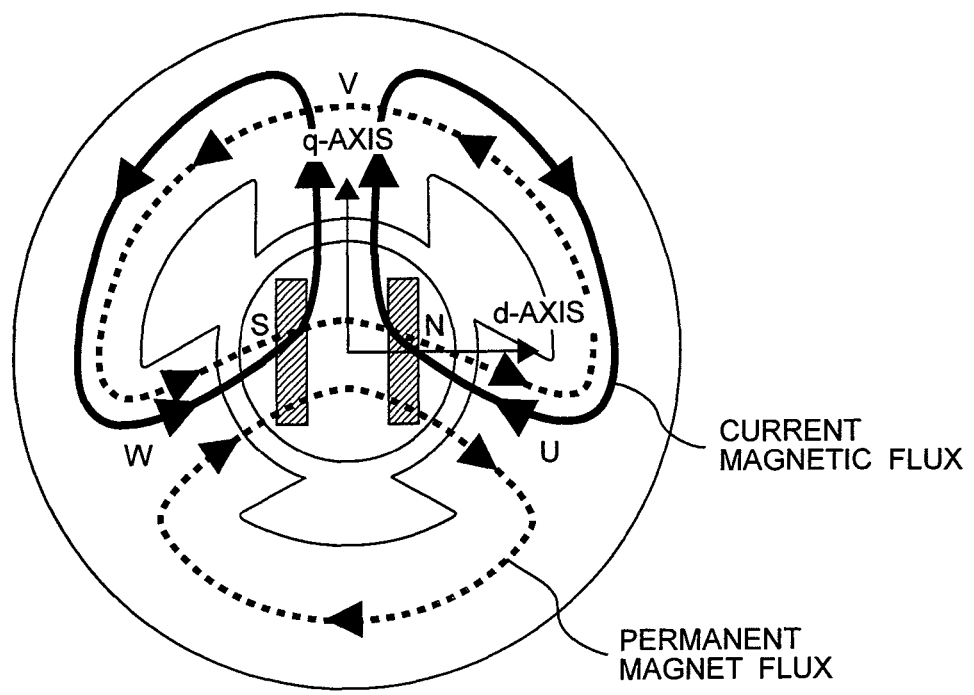
FIG. 7 shows another position of the rotor of the motor in the first embodiment of the present invention.

In this embodiment, the rotor is fixed at the same position as when Ld is obtained, as shown in FIG. 7, and a q-axis current is flowed by flowing a current from the V phase to the U and W phases.

The measurement current command setting part 21 then outputs a current command as described below.

$$Iq^* = Iq_{DC}^* + Iq_{AC}^* \times \sin(\omega 1 \times t) \quad \text{(Equation 6)}$$

The measurement voltage command setting part 22 supplies a voltage command Vq* so that the detected current value Iq matches the current command Iq*.

The magnetic flux change ratio calculating part 23 accepts the angular frequency ω1, voltage command Vq*, and detected current value Iq. The detected current value is approximately represented by the following equation.

$$Iq = Iq_{DC} + Iq_{AC} \times \sin(\omega 1 \times t) \quad \text{(Equation 7)}$$

A change ratio φq' of the magnetic flux φq with respect to a current change in the DC component $Iq_{DC}$ of the detected current value is calculated according to the following equation.

$$\phi q' = d(\phi q)/d(iq) = Vq_{AC}^*/(\omega 1 \times Iq_{AC}^*) \quad \text{(Equation 8)}$$

Figure 8:
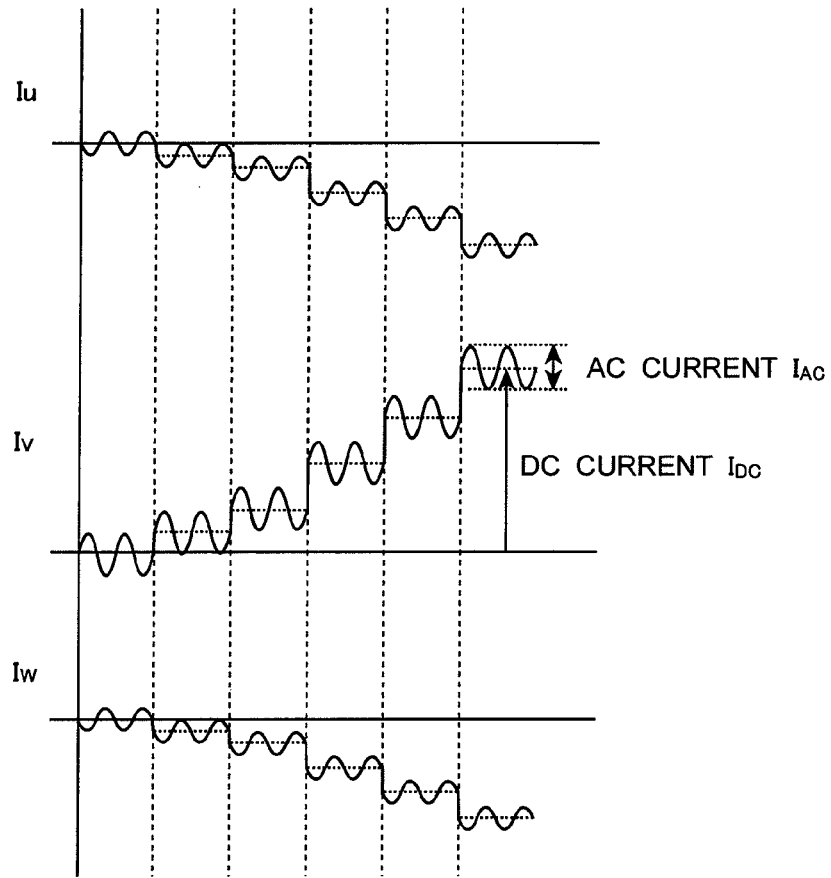
FIG. 8 shows other current waveforms of the motor in the first embodiment of the present invention.

The DC component of the current is changed discontinuously, as shown in FIG. 8. Then, φq' is calculated at different DC current $Id_{DC}$ values.

Figure 9:
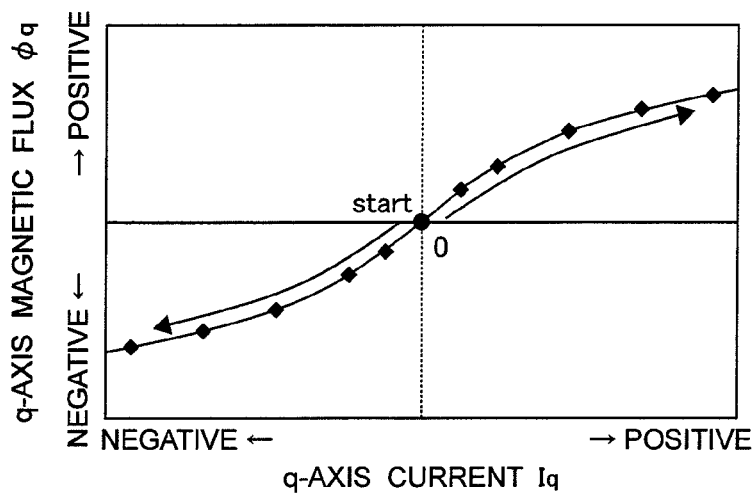
FIG. 9 is a graph of the q-axis magnetic flux in the first embodiment of the present invention.

A magnetic flux calculating part 24 calculates the magnetic flux φq from φq' and Iq entered into it by applying an approximation equation for Taylor expansion in the same way as when φd is calculated. However, φq is 0 when the DC current is 0. Accordingly, as illustrated in FIG. 9, φq values at different DC current values can be calculated, starting from a magnetic flux of 0 at a current of 0.

The inductance calculating part 25 uses φq entered into it to calculate an inductance Lq according to the equation given below, and outputs the calculated inductance.

$$\phi q = Lq \times Iq \quad \text{(Equation 9)}$$

Figure 10:
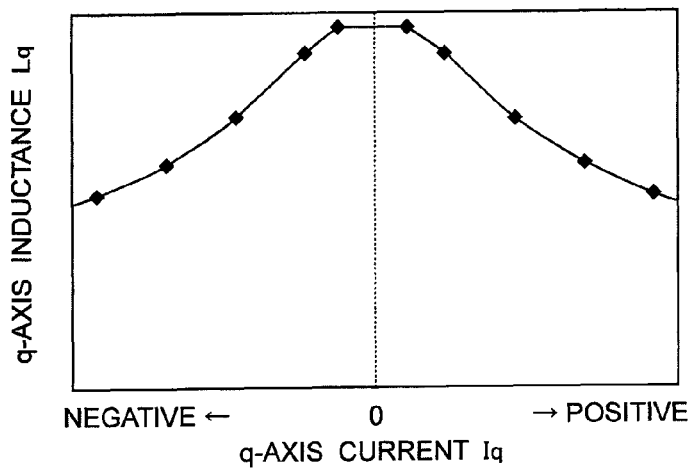
FIG. 10 is a graph of the q-axis inductance in the first embodiment of the present invention.

As a result, Lq is obtained as illustrated in FIG. 10.

The obtained Lq is entered into the table data setting part 26 and stored as table data. When the ordinary driving mode is selected by the mode selecting switch 10, Lq appropriately selected according to the detected current value Iq is entered into the motor control part 12 and used for control.

According to the first embodiment of the present invention, it is possible to measure the inductances Ld and Lq, which are electric constants of the PM motor, with high accuracy. Particularly, a difference in Ld can be measured between when the d-axis current Id is positive and when it is negative, enabling highly accurate Ld necessary for field-weakening control to be measured.

Although, in this embodiment and embodiments described later, the rotor is fixed at the position as shown in FIGS. 3 and 7, the rotor may be fixed at any position when the position can be identified. When Ld is calculated, the permanent magnet flux φm is obtained and used; however, φm may not be obtained but may be set to 0 in the calculation of Ld.

Second Embodiment

A second embodiment of the present invention will be described next.

In the first embodiment, Ld and Lq when Id and Iq are passed alone have been calculated. In practice, however, Id and Iq may be passed at the same time when the motor is driven. When this happens, the magnetic saturation state of the core differs from the case in which Id and Iq are passed alone, so it can be considered that Ld and Lq also differ from the case in which Id and Iq are passed alone. For this reason, when Id and Iq are passed at the same time to drive the motor, accurate Ld and Lq cannot be measured in the first embodiment.

In this embodiment, the above problem is addressed by passing a DC current in the q axis when L is calculated for the d axis and passing a DC current in the d axis when L is calculated for the q axis.

First, how Ld when Iq flows is calculated will be described.

When Iq is 0, Ld can be calculated by using the method, described in the first embodiment, by which Ld when Id is passed alone is calculated.

When Iq is not 0, a non-zero DC value is given to Iq* in the calculation of Ld. Specifically, a positive value is given to $Iq_{DC}^*$ and 0 is given to $Iq_{AC}^*$. Other aspects are the same as in the method of calculating Ld when Id is passed alone. Accordingly, it is possible to calculate Ld when Iq, which is a torque current, is flowing.

Next, how Lq when Id flows is calculated will be described.

When Id is 0, Lq can be calculated by using the method, described in the first embodiment, by which Lq when Iq is passed alone is calculated.

When Id is not 0, a non-zero DC value is given to Id* in the calculation of Lq. Specifically, a positive or negative value is given to $Id_{DC}^*$ and 0 is given to $Id_{AC}^*$. Other aspects are the same as in the method of calculating Lq when Iq is passed alone. Accordingly, it is possible to calculate Lq when Id is negative as in the case when the motor is driven in a weakened field or a reluctance torque is used and when Id is positive as in the case of initial driving.

Third Embodiment

As the values of the DC component to be changed discontinuously in the first and second embodiments, the range from zero to the maximum current is divided into about four segments and at least one point near zero is taken.

Since Ld and Lq are approximated by using equations in this embodiment, less data is used to calculate Ld and Lq.

Figure 11:
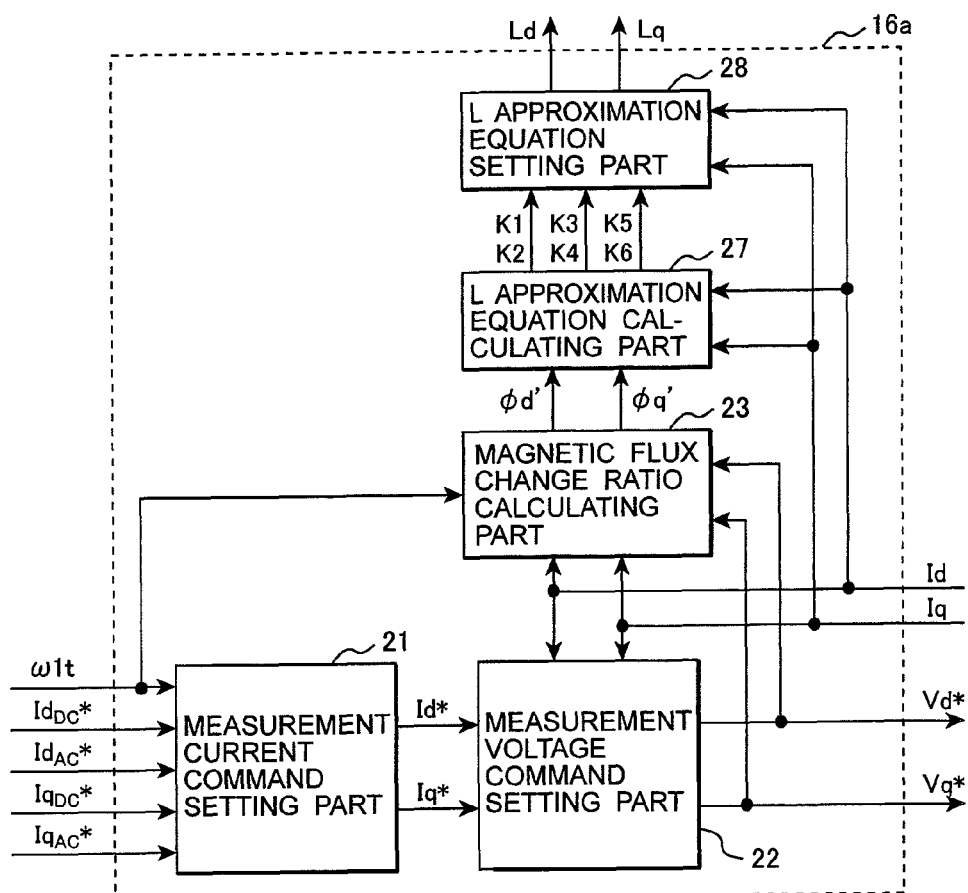
FIG. 11 is a block diagram showing the systematic structure of a motor constant calculating part in a third embodiment of the present invention.

The structure in this embodiment is almost identical to the structure shown in FIG. 1, but differs in that the motor constant calculating part 16 is replaced with a motor constant calculating part 16a shown in FIG. 11.

The operation of the motor constant calculating part 16a will be described in detail with reference to FIG. 11.

It is known that Ld and Lq nonlinearly change with respect to current as shown in FIGS. 6 and 10, so approximation equations given below are used to represent the relation between these inductances and current.

$$Ld = K1/(1 + K2 \times Id) \text{ (when } Id > 0) \quad \text{(Equation 10)}$$

$$Ld = K3/(1 - K4 \times Id) \text{ (when } Id < 0) \quad \text{(Equation 11)}$$

$$Lq = K5/(1 + K6 \times |Iq|) \quad \text{(Equation 12)}$$

The following relational equations are derived from these equations and the equation, described above, that represents the relation between the magnetic flux and current.

$$\phi d' = d(\phi d)/d(id) \quad \text{(Equation 13)}$$
$$= K1/(1 + K2 \times Id)^{\wedge}2 \quad \text{(when } Id > 0\text{)}$$

$$\phi d' = d(\phi d)/d(id) \quad \text{(Equation 14)}$$
$$= K3/(1 - K4 \times Id)^{\wedge}2 \quad \text{(when } Id < 0\text{)}$$

$$\phi q' = d(\phi q)/d(iq) \quad \text{(Equation 15)}$$
$$= K5/(1 + K6 \times |Iq|)^{\wedge}2$$

First, how Ld when Id is passed alone is calculated will be described.

For example, the direction of the permanent magnet flux of the PM motor 5 is made to match the direction of a magnetic flux generated by passing a current between the U and W phases, and the rotor is fixed by the rotor fixing device 6 as shown in FIG. 3.

This embodiment is identical to the first embodiment up to a point at which the magnetic flux change ratio calculating part 23 calculates φd', but differs in that φd' is entered into an L approximation equation calculating part 27.

Figure 12:
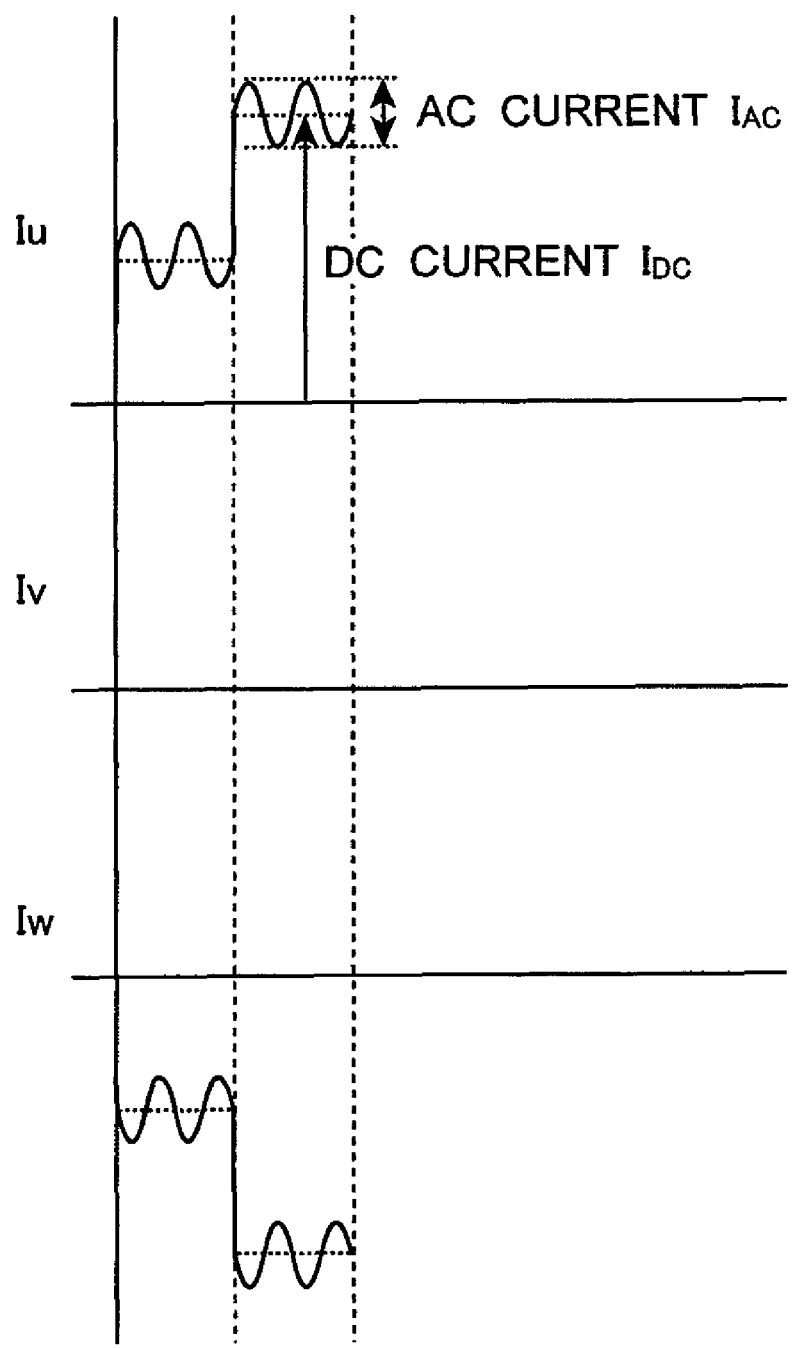
FIG. 12 shows current waveforms of the motor in the third embodiment of the present invention.

The AC component of the current is made fixed and the DC component is discontinuously changed, as shown in FIG. 12, so as to calculate φd' at different DC current values. As the values of the DC component to be changed discontinuously, two points are taken in the range from zero to the maximum current.

As indicated by equation 13, φd' includes two unknown coefficients, K1 and K2, when Id is greater than 0. As indicated by equation 14, φd' also includes two unknown coefficients, K3 and K4, when Id is smaller than 0. Accordingly, when Id is greater than 0, if the magnetic flux change ratio calculating part 23 measures φd' at two current values and assigns the measured values to equation 13, the unknown values, K1 and K2, are determined; when Id is smaller than 0, if the magnetic flux change ratio calculating part 23 measures φd' at two current values and assigns the measured values to equation 14, the unknown coefficients, K3 and K4, are determined.

The determined coefficients K1, K2, K3, and K4 are entered into an L approximation equation setting part 28 and stored therein. When the ordinary driving mode is selected by the mode selecting switch 10, Ld is calculated by the L approximation equation setting part 28 according to equation 10 or 11, on the basis of the detected current value Id. The calculated Ld is then given to the motor control part 12, and used for control.

Next, how Lq when Iq is passed alone is calculated will be then described.

In this embodiment, the rotor is fixed at the same position as when Ld is calculated, as shown in FIG. 7, and a q-axis current is flowed by flowing a current from the V phase to the U and W phases.

This embodiment is identical to the first embodiment up to a point at which the magnetic flux change ratio calculating part 23 calculates φq', but differs in that φq' is entered into the L approximation equation calculation part 27.

Figure 13:
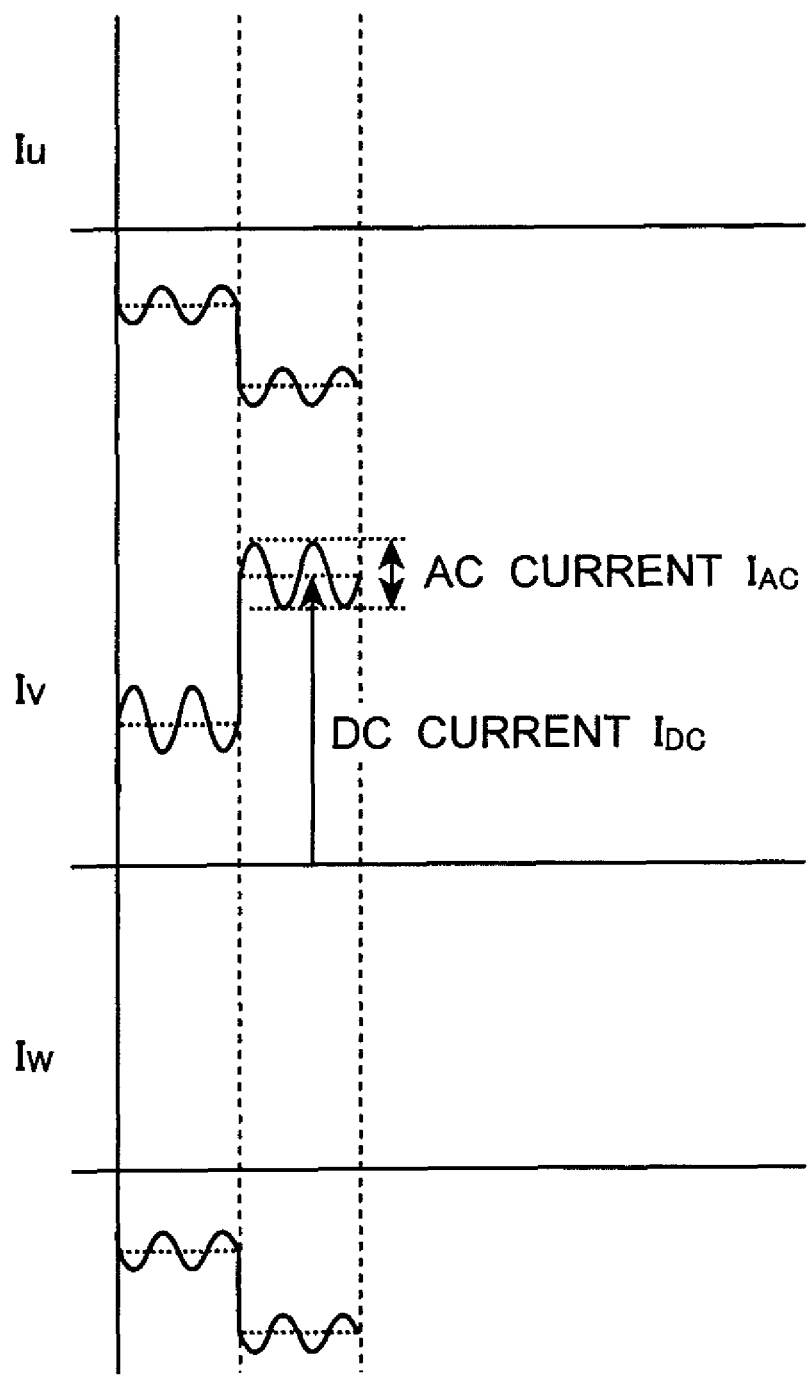
FIG. 13 shows other current waveforms of the motor in the third embodiment of the present invention.

The AC component of the current is made fixed and the DC component is discontinuously changed, as shown in FIG. 13, so as to calculate φq' at different DC current values. This embodiment differs in that, as the values of the DC component to be changed discontinuously, two points are taken in the range from zero to the maximum current.

As indicated by equation 15, φq' includes two unknown coefficients, K5 and K6. Accordingly, if φq' is measured at two current values and the measured values are assigned to equation 15, the unknown value are determined.

The determined coefficients K5 and K6 are entered into the L approximation equation setting part 28 and stored therein. When the ordinary driving mode is selected by the mode selecting switch 10, Lq is calculated by the L approximation equation setting part 28 according to equation 12, on the basis of the detected current value Iq. The calculated Lq is then given to the motor control part 12, and used for control.

As described above, the use of approximation equations enables inductance values, which nonlinearly change with respect to current, to be obtained with less data; when the obtained inductance values are used for control, sensorless control, high-efficiency control, and other types of control can be achieved with comparatively high precision.

Fourth Embodiment

A positional sensor and current sensor are used in the exemplary structures in the first to third embodiments. However, a structure in which the current sensor is used but the positional sensor is eliminated can also be implemented, as described below with reference to FIG. 14.

Figure 14:
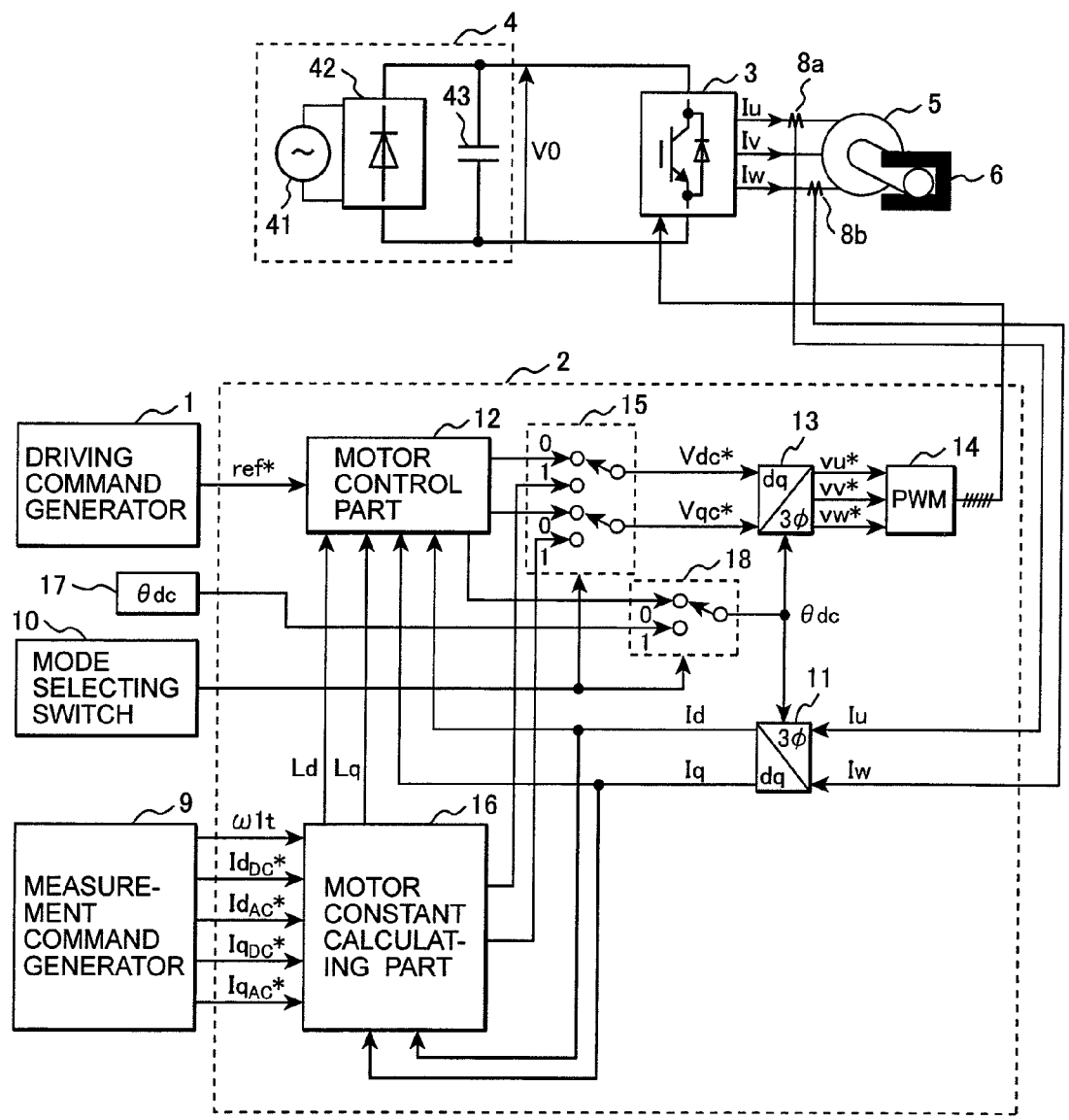
FIG. 14 is a block diagram showing the systematic structure in a fourth embodiment of the present invention.

FIG. 14 differs from FIG. 1 in that the position detector 7 is eliminated and a position command θdc in the ordinary driving mode is supplied from the motor control part 12. Another difference is that a position command generator 17 is added, which enters the rotor position θdc of the PM motor 5 to the control unit 2 in the constant measurement mode. A position command switching part 18 is also added, which receives a signal from the mode selecting switch 10; the voltage command switch 15 is switched to 0 in the ordinary driving mode, and to 1 in the constant measurement mode.

The method of measuring electric constants is the same as in the first to third embodiments.

Fifth Embodiment

The current sensor is used but the positional sensor is eliminated in the fourth embodiment. However, a structure in which both the positional sensor and the current sensor are eliminated can also be implemented, as described below with reference to FIG. 15.

Figure 15:
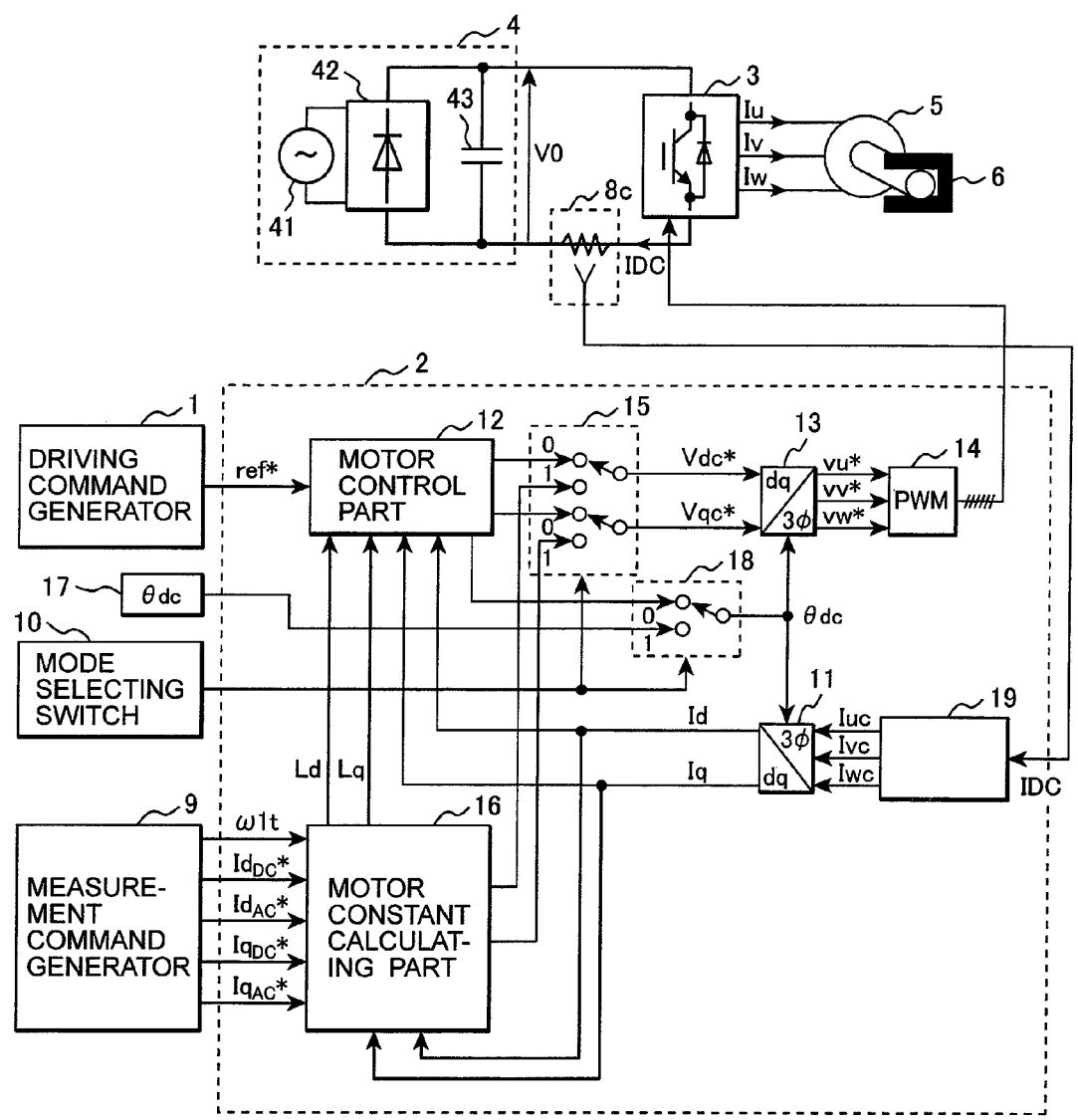
FIG. 15 is a block diagram showing the systematic structure in a fifth embodiment of the present invention.

FIG. 15 differs from FIG. 14 in that the current detecting part 8a for detecting the current Iu and the current detecting part 8b for detecting the current Iw are eliminated and a current detecting part 8c for detecting a power supply current IDC supplied from the DC power supply 4 to the inverter 3. A current reproducing part 19 is also added, which performs calculation, on the basis of the power supply current IDC detected by the current detecting part 8c, by the method described in Japanese unexamined patent application No. 8-19263 to reproduce the three-phase AC currents Iu, Iv, and Iw, which flow in the PM motor 5.

The method of measuring electric constants is the same as in the first to third embodiments.

According to the present invention, electric constants of an AC motor can be measured with comparatively high accuracy.

When the highly accurate electric constants are used in torque control, the torque control can be made comparatively highly precise, enabling the motor to be driven highly efficiently at high response speed.

When the accurate electric constants are used in a position sensorless structure, a position can be estimated with comparatively high accuracy, improving control performance in position sensorless control.

What is claimed is:

1. A controller for an AC motor that controls the AC motor, wherein the controller includes a motor control part and a motor constant calculating part, and wherein the controller has a motor constant measurement mode that differs from a driving mode for the AC motor, wherein in the motor constant measurement mode, a synthesized current, resulting from superimposing an AC current to a DC current, is supplied from an inverter, and a DC current component of the synthesized current is continuously or discontinuously changed to several different values within a measurement period, and wherein the motor constants, to be used by the motor control part to control said AC motor, and which respectively correspond to the several different values of the DC current components, are calculated by the motor constant calculating part, based on the several different values of the DC current components.

2. The controller for an AC motor according to claim 1, wherein the synthesized current includes components corresponding to a direct axis and a quadrature axis of the AC motor.

3. The controller for an AC motor according to claim 1, wherein as values of the DC component to be changed discontinuously, values obtained by dividing the range from zero to a maximum current into a plurality of segments as well as many values near zero are selected.

4. The controller for an AC motor according to claim 1, wherein as values of the DC component to be changed discontinuously, values at any two points in the range from zero to a maximum current are selected.

5. A constant measuring apparatus having an inverter for driving an AC motor, and a controller for controlling the inverter, wherein the controller includes a motor control part and a motor constant calculating part, and wherein the controller has a motor constant measurement mode that differs from a driving mode for the AC motor, wherein in the motor constant measurement mode, a synthesized current, resulting from superimposing an AC current to a DC current, is supplied from the inverter, and a DC current component of the synthesized current is continuously or discontinuously changed to several different values within a measurement period, and wherein the motor constants, to be used by the motor control part to control said AC motor, and which respectively correspond to the several different values of the DC current components, are calculated by the motor constant calculating part, based on the several different values of the DC current components.

6. A controller for an AC motor that controls the AC motor, wherein the controller has a motor constant measurement mode that differs from a driving mode for the AC motor; in the motor constant measurement mode, a synthesized current, resulting from superimposing an AC current to a DC current, is supplied from an inverter, and a change ratio of a magnetic flux with respect to a current change near a DC current value is calculated from an AC component of a supplied voltage, an AC component of a detected current, and a frequency of an AC current.

7. The controller for an AC motor according to claim 6, wherein a DC component of the synthesized current is continuously or discontinuously changed, and a plurality of change ratios of a magnetic flux with respect to current changes near a plurality of DC current values are calculated so as to calculate a magnetic flux from the plurality of change ratios of the magnetic flux.

8. The controller for an AC motor according to claim 7, wherein an inductance value of the AC motor is calculated from the calculated magnetic flux.

9. The controller for an AC motor according to claim 7, wherein a direct-axis inductance Ld and a quadrature-axis inductance Lq measured in the motor constant measurement mode are given to the controller by use of approximation equations below that are determined by a direct-axis current Id and a quadrature-axis current Iq $$Ld = K1/(1 + K2 \times Id) \ldots \text{(when } Id > 0\text{)}$$

$$Ld = K3/(1 - K4 \times Id) \ldots \text{(when } Id < 0\text{)}$$

$$Lq = K5/(1 + K6 \times |Iq|).$$

10. A controller for an AC motor that controls the AC motor, wherein the controller includes a motor control part and a motor constant calculating part, and wherein the controller has a motor constant measurement mode that differs from a driving mode for the AC motor, wherein, in the motor constant measurement mode, a synthesized current, resulting from superimposing an AC current to a DC current, is supplied from an inverter to the AC motor and to the motor constant calculating part, wherein the synthesized current includes components corresponding to a direct axis and a quadrature axis of the AC motor, wherein, a DC current component of the synthesized current is continuously or discontinuously changed, a DC current is supplied to another axis of the AC motor different from the axis to which the synthesized current is supplied, and the DC current is continuously or discontinuously changed to several different values within a measurement period, and wherein the motor constants, to be used by the motor control part to control said AC motor, and which respectively correspond to the several different values of the DC current components, are calculated by the motor constant calculating part, based on the several different values of the DC current components.

* * * * *